UNITED STATES PATENT OFFICE 2,117,207

AMINO ACIDS

Ludwig Orthner, Frankfort-on-the-Main, Germany, assignor to I. G. Farbenindustrie Aktiengesellschaft, Frankfort-on-the-Main, Germany No Drawing. Application January 20, 1936, Serial No. 59,998. In Germany September 19, 1934

10 Claims. (Cl. 260—112)

The present invention relates to new amino acids which are valuable assistants in the textile and allied industries.

It is known that amino carboxylic and sulfonic acids which are acylated in an amino group by a high molecular aliphatic or cycloaliphatic radical are valuable assisting agents in the textile industry.

I have now found that of such amino acids those are of especial value which contain the grouping

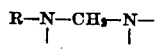

in which formula R is the radical of a high molecular organic acid selected from the group consisting of carboxylic acids and sulfonic acids (including acid sulfuric esters). The said new products can be easily prepared, for instance, by causing an amide of a high molecular carboxylic or sulfonic acid containing at least 8 carbon atoms and having at least 1 hydrogen atom directly connected to a nitrogen atom, to react with formaldehyde and a low molecular amino carboxylic or sulfonic acid having at least 1 hydrogen atom directly connected to a nitrogen atom.

As amino acids suitable for the present process there may be mentioned, for instance, glycocoll, glycocoll esters, $\beta$-amino-propionic acid, sarcosine, sarcosine esters, butyl glycocoll, taurine, methyl taurine, butyl taurine and 2-toluidine-5-sulfonic acid. Suitable acid amides are, for example, the amides, monoalkyl amides, cycloalkylamides or aryl amides of lauric acid, oleic acid, stearic acid, mixtures of fatty acids obtained by saponification of natural fats and oils, acids obtained by oxidizing paraffin, naphthenic acids, resin acids, lauryl glycocoll, heptadecyl, oxaminic acid and octadecyl sulfonic acid. The acids mentioned may also be advantageously substituted, for instance, by halogen.

The components may either be condensed at the same time or one of the components may be condensed with the formaldehyde to form the methylol compound, which is then condensed with the second component. Instead of formaldehyde, also substances yielding formaldehyde may be employed. The condensation may be carried out in the presence of non-aqueous solvents; if desired, it is, however, also possible to perform the condensation in an aqueous solution or emulsion. Any water insoluble impurities present in the end products can be removed by a treatment with suitable solvents.

The products thus obtained exhibit a good foaming capacity in aqueous solutions and are suitable as auxiliary agents in the treatment of textiles and the like, for instance, for washing softening and dyeing purposes. They can be advantageously employed in hard water as no insoluble compounds are formed. The new products may be employed as such, in mixtures or in combination with other suitable substances, such, for instance, as soaps, textile assistants, glue, starch, mucilages, solvents such as alcohols, ketones, hydrocarbons and so on.

The following examples illustrate the invention without limiting it thereto, the parts being by weight:—

Example 1

14 parts of dioxane containing 2.8 parts of oleic acid amide, 1.2 parts of sarcosine ethyl ester and 1 part of a 30% aqueous solution of formaldehyde are boiled for 3 hours under reflux. After evaporation of the dioxane the condensation product is saponified with the aid of a methyl alcoholic solution of potassium hydroxide. After evaporation of the alcohol, water insoluble impurities are removed by treating the product with acetone. The end product obtained forms strongly foaming solutions which are resistant to hard water.

Example 2

A solution of 20 parts of sarcosine and 11 parts of sodium hydroxide in 160 parts of water is heated with 24 parts of a 30% aqueous solution of formaldehyde for 3 quarters of an hour to 70–75° C. 50 parts of oleylamide are then stirred into the reaction mixture, and the condensation is continued for another half hour at the same temperature. After evaporation of the solvent, insoluble impurities are removed with the aid of acetone. A product is obtained which forms strongly foaming solutions of an excellent resisting capacity towards hard water.

Example 3

100 parts of a 38.7% aqueous solution of the sodium salt of methyl taurine are condensed with 25 parts of a 30% aqueous solution of formaldehyde and 100 parts of water for a quarter of an hour at 75° C. 55 parts of oleylamide are then introduced into the reaction mixture, and the condensation is continued for another half hour at 75° C., while stirring. After evaporation of the water insoluble impurities are removed with the aid of acetone. The water-soluble substance obtained yields strongly foaming solutions, which are even clear in the presence of calcium salts. It exhibits an excellent dispersing powder for calcium soaps.

Example 4

25 parts of 2-toluidine-5-sulfonic acid dissolved in 200 parts of water and 20 parts of a 10% aqueous solution of sodium hydroxide are condensed with 15 parts of a 30% aqueous solution of formaldehyde and then condensed with 28 parts of oleylamide. The reaction conditions and the manner of working up are the same as in Example 3. The product obtained yields strongly foaming solutions.

Example 5

10 parts of lauric acid amide are suspended in a 4% soda solution in 80% aqueous dioxane and heated on the water bath with 6 parts of a 30% aqueous formaldehyde solution, until the amide is completely dissolved. On cooling the methylol amide precipitates and can be purified by recrystallizing, for instance, from ethyl acetate. A solution of 11.4 parts of the methylol compound in a mixture of 5 parts of water and 50 parts of methyl alcohol is added to a boiling solution of 7 parts of methyl taurine and 2 parts of caustic soda in about 90% aqueous methyl alcohol, and heated for about 3 hours under a reflux condenser. After evaporating the solvents the product is dried and several times extracted with acetone. It yields with water clear, foaming solutions.

Example 6

Untreated viscose yarn is treated in the usual manner in a bath containing per liter 2–3 gs. of a product obtained in accordance with the manner described in Example 2. After centrifuging and drying, a silk is obtained which possesses an agreeable soft feel.

Example 7

A bath containing per liter 2–3 gs. of a product obtained in accordance with the manner described in Example 3 and 2 gs. of sodium carbonate possesses an excellent cleansing power for soiled cotton; even if hard water is employed, no precipitation by calcium or magnesium salts occurs.

I claim:

1. As new products amino acids of the formula

in which X is a low molecular organic radical containing an acid group selected from the group consisting of the carboxylic and sulfonic acid groups, R is a radical containing at least 8 carbon atoms selected from the group consisting of the radicals of carboxylic acids, sulfonic acids and acid sulfuric esters, and $R_1$ and $R_2$ stand for a substituent selected from the group consisting of hydrogen, alkyl, cycloalkyl and aryl.

2. As new products amino carboxylic acids of the formula

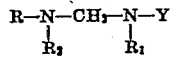

in which Y is a low molecular organic radical containing a carboxylic acid group, R is a radical containing at least 8 carbon atoms selected from the group consisting of the radicals and carboxylic acids, sulfonic acids and acid sulfuric esters, and $R_1$ and $R_2$ stand for a substituent selected from the group consisting of hydrogen, alkyl, cycloalkyl and aryl.

3. As new products amino sulfonic acids of the formula

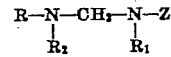

in which Z is a low molecular organic radical containing a sulfonic acid group, R is a radical containing at least 8 carbon atoms selected from the group consisting of the radicals of carboxylic acids, sulfonic acids and acid sulfuric esters, and $R_1$ and $R_2$ stand for a substituent selected from the group consisting of hydrogen, alkyl, cycloalkyl and aryl.

4. As new product an amino carboxylic acid of the general formula

in which R is a radical containing at least 8 carbon atoms selected from the group consisting of the radicals of carboxylic acids, sulfonic acids and acid sulfuric esters, and $R_1$ stands for a substituent selected from the group consisting of hydrogen and methyl.

5. As new product an amino sulfonic acid of the general formula

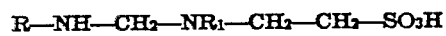

in which R is a radical containing at least 8 carbon atoms selected from the group consisting of the radicals of carboxylic acids, sulfonic acids and acid sulfuric esters, and $R_1$ stands for a substituent selected from the group consisting of hydrogen and methyl.

6. An amino carboxylic acid as defined in claim 4, in which R is the radical of a high molecular fatty acid.

7. An amino sulfonic acid as defined in claim 5, in which R is the radical of a high molecular fatty acid.

8. A process for preparing new amino acids by causing a high molecular organic acid amide selected from the group consisting of carboxylic acid amides and sulfonic acid amides containing at least 1 hydrogen atom directly connected to a nitrogen atom to react with formaldehyde and an organic amino acid having at least 1 hydrogen atom directly connected to a nitrogen atom.

9. A process according to claim 8, in which instead of free formaldehyde a substance yielding formaldehyde is used.

10. A process according to claim 8, in which the methylol compound of a high molecular organic acid amide is caused to react with an organic amino acid having at least 1 hydrogen atom directly connected to a nitrogen atom.

LUDWIG ORTHNER.